United States Patent [19]

Clausen

[11] Patent Number: 5,771,814
[45] Date of Patent: Jun. 30, 1998

[54] KEYBOARD TRAY INCLUDING RETRACTABLE MOUSE TRAY

[75] Inventor: Eivind Clausen, Bellingham, Wash.

[73] Assignee: Allsop, Inc., Bellingham, Wash.

[21] Appl. No.: 858,294

[22] Filed: May 19, 1997

Related U.S. Application Data

[63] Continuation of Ser. No. 339,327, Nov. 14, 1994, abandoned.

[51] Int. Cl.$^6$ .................................................. A47B 57/00
[52] U.S. Cl. ............................................ 108/93; 312/273
[58] Field of Search .................................. 312/273, 295, 312/271, 309; 74/89.17, 89.18; 108/93, 94, 59, 102, 103, 142, 143, 140, 139

[56] References Cited

U.S. PATENT DOCUMENTS

| | | | |
|---|---|---|---|
| 2,037,919 | 4/1936 | Poe ............................................ | 108/93 |
| 4,863,124 | 9/1989 | Ball et al. ................................. | 108/94 |
| 5,205,631 | 4/1993 | Wegman et al. . | |
| 5,287,246 | 2/1994 | Sen . | |
| 5,339,213 | 8/1994 | O'Callaghan . | |

*Primary Examiner*—Peter M. Cuomo
*Assistant Examiner*—Gerald A. Anderson
*Attorney, Agent, or Firm*—Christensen O'Connor Johnson & Kindness PLLC

[57] ABSTRACT

An apparatus for holding a computer keyboard and mouse adjacent a table or similar structure is disclosed. The apparatus includes a mounting bracket and three rail brackets, two rail guides secured to the brackets, a keyboard drawer, and a mouse tray. The brackets are securable beneath the table. One of the rail guides is secured to the mounting bracket and to one of the rail brackets while the other rail guide is secured between two rail brackets. The keyboard drawer includes a rail on each side slidably coupleable to the rail guides. One of the rails also includes a gear rack attached along at least a portion thereof The rail has a forward portion and a rearward portion with the rack preferably attached to the forward portion. The mouse tray is pivotally coupled to the mounting bracket and includes a gear engageable with the rack. The mouse tray also includes a shoulder adjacent the gear. The shoulder includes a flat portion slidably engageable with a rearward portion of the rail to prohibit rotation of the tray along the rearward portion of the rail. The shoulder is non-rotatably attached to the mouse tray. The rail also includes a recessed portion adjacent the rack for allowing the shoulder to rotate with respect to the rail when the gear is engaged with the rack.

17 Claims, 5 Drawing Sheets

KEYBOARD TRAY INCLUDING RETRACTABLE MOUSE TRAY

This application is a continuation application of application Ser. No. 08/339,327, filed on Nov. 14, 1994 now abandoned.

FIELD OF THE INVENTION

This invention relates generally to drawers mounted beneath a desk or table top and, more particularly, to retractable keyboard and mouse trays, typically for use with computers.

BACKGROUND OF THE INVENTION

Keyboard drawers have long been used to maximize table-top space when using a computer. A typical drawer attaches beneath a desk or table top and slides outwardly for use. The drawers are convenient when needed and out of the way when not in use.

However, most of these drawers do not accommodate a mouse or other pointer instrument. These mouse-type instruments have become increasingly popular as a control interface. Users find such instruments natural and easy to use especially with the menu driven software that is prevalent in the market.

Due to the convenience of keyboard drawers and the necessity for mouse-type instruments a need exists for a mouse tray to hold a mouse next to the keyboard tray. The user of a keyboard in a drawer must sit further back since the keyboard is extended out from the desk. The mouse thus becomes further from the user and the user must lean and reach to use the mouse. Thus, it becomes somewhat inconvenient to use the two instruments together.

Some keyboard drawers have been developed that include a separate pull out mouse drawer beneath or beside the keyboard drawer. The drawer pulls out to the side of the keyboard drawer once the keyboard drawer is extended from beneath a table top. However, this arrangement is somewhat inconvenient and also reduces the clearance between the bottom of the drawer and the users legs. U.S. Pat. No. 5,205,631 discloses a specially designed desk with a keyboard drawer 18 and a separate mouse receptacle 87. The receptacle uses space next to the keyboard drawer that may not be available with a standard desk or table. Also the drawer must be separately pulled from within the desk.

The present invention was developed to provide a mouse tray that is convenient to use, maximizes table space, and does not diminish clearance. As discussed below, a mouse tray is provided that automatically extends when the keyboard drawer is extended. It automatically retracts to a position above the keyboard drawer when the drawer is retracted. The tray allows the mouse to be positioned next to the keyboard for convenient use.

SUMMARY OF THE INVENTION

The present invention includes an apparatus for holding articles adjacent to a structure. The apparatus includes a retractable drawer and tray. The retractable drawer has a rail movably coupleable to the structure for forward and rearward movement relative to the structure. The tray is pivotally mountable to the structure adjacent the rail. The tray includes means for engaging the rail and means for pivoting the tray when the drawer is moved forwardly or rearwardly relative to the structure.

Preferably, the rail is slidably coupleable to the structure and the means for engaging the rail includes a rack attached along at least a portion of the rail and a gear engageable with the rack attached to the tray. Thus, engagement of the gear with the rack combined with sliding movement of the rail causes the tray to pivot.

In the preferred embodiment of the invention, the apparatus is adapted for holding a computer keyboard and pointer instrument, such as a mouse, adjacent a table or similar structure. A mounting bracket secures the apparatus to the underside of a table. A keyboard drawer is slidably attachable to the mounting bracket with the rail on one side. The tray is pivotally attachable to the mounting bracket.

The rail of the keyboard drawer slides along a rail guide which is secured to the mounting bracket. The rail has a forward portion and a rearward portion with the rack preferably attached to the forward portion.

In one preferred embodiment, the tray further includes a shoulder adjacent the gear. The shoulder includes a flat portion slidably engageable with the rearward portion of the rail to prohibit rotation of the tray while adjacent the rearward portion of the rail. The shoulder is non-rotatably attached to the mouse tray. The rail also includes a recessed portion adjacent the rack for allowing the shoulder to rotate with respect to the rail when the gear is engaged with the rack.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
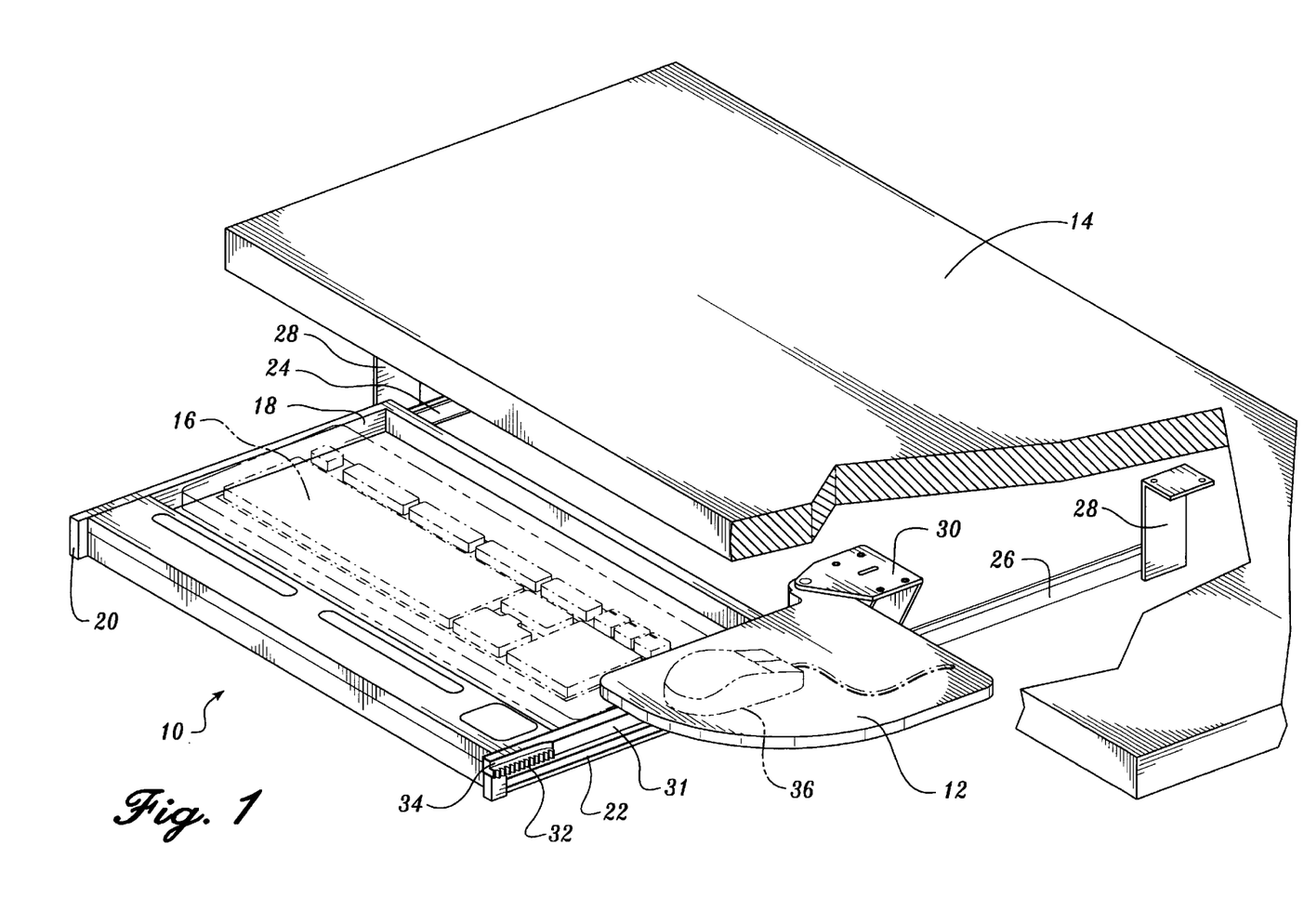
FIG. 1 is an isometric view of the keyboard tray including the retractable mouse tray of the present invention.

Use of the keyboard and mouse tray of the present invention with a table top is illustrated in FIG. 1. A keyboard tray 10 and a mouse tray 12 are secured to the underside of table 14. Keyboard tray 10 may be of any design that provides a retraction mechanism for keyboard 16. Preferably, keyboard tray 10 is generally rectangular in shape and slightly larger than a standard keyboard 16 so as to be able to hold keyboard 16 therein and to provide a wrist rest area in front of keyboard 16. Keyboard tray 10 preferably includes a recess 18 into which keyboard 16 is placed. The sides of keyboard tray 10 include left rail 20 and right rail 22. These rails may include wheels or other friction reducing means. Left and right rails 20 and 22 engage within left and right rail guides 24 and 26, respectively. Left and right rail guides 24 and 26 extend beneath table 14 to guide the sliding motion of keyboard tray 10 when it is retracted underneath or extended from under table 14. Left and right rail guides 24 and 26 are held parallel to one another beneath table 14 with guide brackets 28. Guide brackets 28 are secured to the underside of table 14 with screws. Thus, keyboard tray 10 is extendible and retractable beneath table 14 sliding left and right rails 20 and 22 within left and right rail guides 24 and 26.

In the preferred embodiment of the present invention, the right front bracket is mounting bracket 30 adapted for securing not only right rail guide 26 but also mouse tray 12. Furthermore, the right side of keyboard tray 10, above right rail 22 is capped with a cover 31. Cover 31 is attached to keyboard tray 10 with small projections that snap within corresponding recesses on the sides of the right side of keyboard tray 10 above right rail 22. The side of keyboard tray 10 along with cover 31 may also be considered part of said right rail 22. Cover 31 includes a rack 32 with gear teeth extending outwardly therefrom along a forward portion of the right side of cover 31 and a shoulder recess 34 above rack 32. Shoulder recess 34 is a generally rectilinear recess that extends inwardly from rack 32 above and substantially along the length of rack 32. Alternatively, rack 32 and recess 34 could be an integral part of rail 22.

Mouse tray 12 is adapted for placing a mouse 36 thereon for use when using a computer. As will be explained in more detail below in connection with FIGS. 2 through 5, mouse tray 12 retracts beneath table 14 and above keyboard tray 10 when keyboard tray 10 is retracted beneath table 14. Likewise, mouse tray 12 pivots outwardly to an extended position, as shown in FIG. 1, when keyboard tray 10 is pulled outwardly to an extended position. This feature is carried about by the interconnection between cover 31 and the pivotal connection and members of mouse tray 12.

Figure 2:
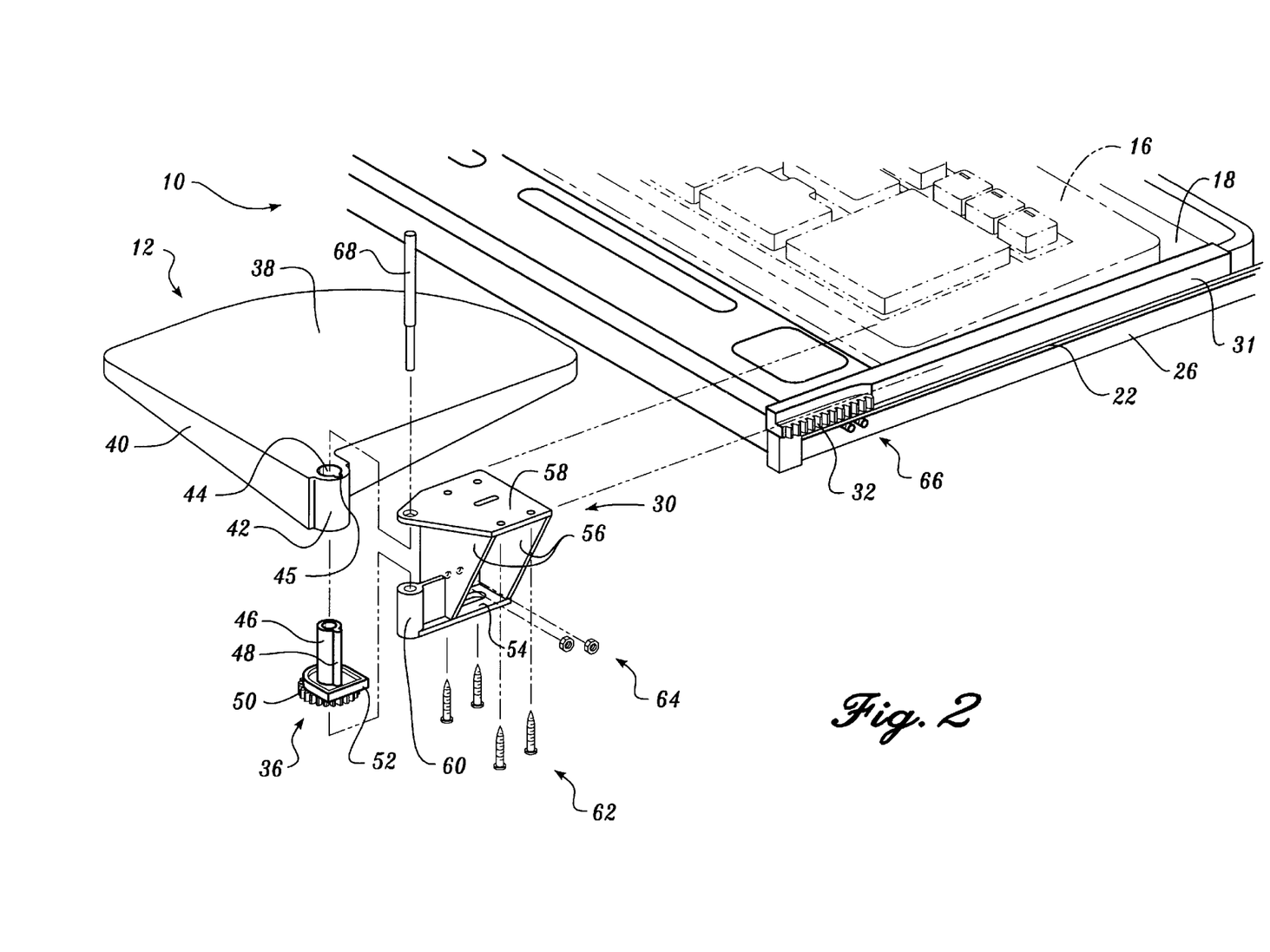
FIG. 2 is an enlarged exploded view of the mounting hardware for the mouse tray.

FIG. 2 illustrates the connection members of mouse tray 12 and mounting bracket 30. The interconnection is accomplished with mouse tray 12, interconnect member 36, mounting bracket 30, and cover 31. Mouse tray 12 includes a tray surface generally the shape of a quarter pie with two edges running perpendicular one to another and a third, generally arcuate, edge curving away from the outer ends of the perpendicular rectilinear edges to form a surface large enough to hold a standard mouse and provides an area on which the mouse may be moved. Tray surface 38 is supported by tray supports 40 extending vertically beneath tray surface 38. A mounting arm 42 also extends from tray supports 40 and tray surface 38 to form an aperture 44 through which a pivotal connection can be made to mounting bracket 30. Mounting arm 42 forms a cylinder extending from the corner created at the juncture of the perpendicular edges of tray surface 38 and tray supports 40 with aperture 44 forming the hole in the center of the cylinder. A groove 45 is provided within aperture 44 and extends along the side of aperture 44 parallel to the center axis of aperture 44.

Interconnect member 36 is made up of a vertical cylinder 46 that includes a vertical rib 48 extending along its outside surface. A gear 50 is positioned at the bottom of cylinder 46 with the face of gear 50 being perpendicular to the vertical axis of cylinder 46. A shoulder 52 projects upwardly from gear 50 at the base of the teeth of gear 50. Shoulder 52 includes an extended portion which forms a flat surface along one side of shoulder 52. The distance from the center of cylinder 46 to the flat surface of shoulder 52 is approximately equal to the radius of gear 50. Thus, shoulder 52 is generally U shaped with a closed, flat top. Rib 48 and cylinder 46 fit within groove 45 and aperture 44, respectively. Rib 48 prevents cylinder 46 from rotation within aperture 44. Therefore, as gear 50 is rotated about the vertical axis of cylinder 46, mouse tray 12 is pivoted about aperture 44.

Mounting bracket 30 includes a bottom plate 54, upright walls 56, upper plate 58, and a bracket cylinder 60. Bottom plate 54 is generally rectangular in shape and in a plane parallel to the plane of tray surface 38. Upright walls 56 preferably extend vertically upward from bottom plate 54. Upright walls 56 flare outwardly as they extend upwardly to their attachment to the underside of upper plate 58. Upper plate 58 is in a plane parallel to bottom plate 54 and is larger than bottom plate 54. Upper plate 58 includes a rectilinear portion between the attachment to upright walls 56 as well as a triangular portion extending forwardly therefrom with an aperture at the outer corner of the triangle. This aperture is vertically aligned with bracket cylinder 60 which is attached at its base to bottom plate 54. Screws are provided for securing mounting bracket 30 to the underside of table 14. Bracket bolts 66 are provided through right rail guide 26 for securing right rail guide 26 to mounting bracket 30 with nuts 64. Other fastening means may also be employed.

Finally, a shaft 68 is provided for extending through the aperture and upper plate 58, the center of cylinder 46, and into bracket cylinder 60. The aperture in bracket cylinder 60 is smaller then that of cylinder 46 and the aperture in upper plate 58. A reduced portion of shaft 68 is provided on the bottom thereof to fit within bracket cylinder 60. This arrangement also ensures that shaft 68 does not slip through bracket cylinder 60 but remains in place to secure mouse tray 12 to mounting bracket 30. Thus, a head is not necessary on shaft 68 that would interfere with the positioning of upper plate 58 flush against the under side of table 14.

Figure 3:
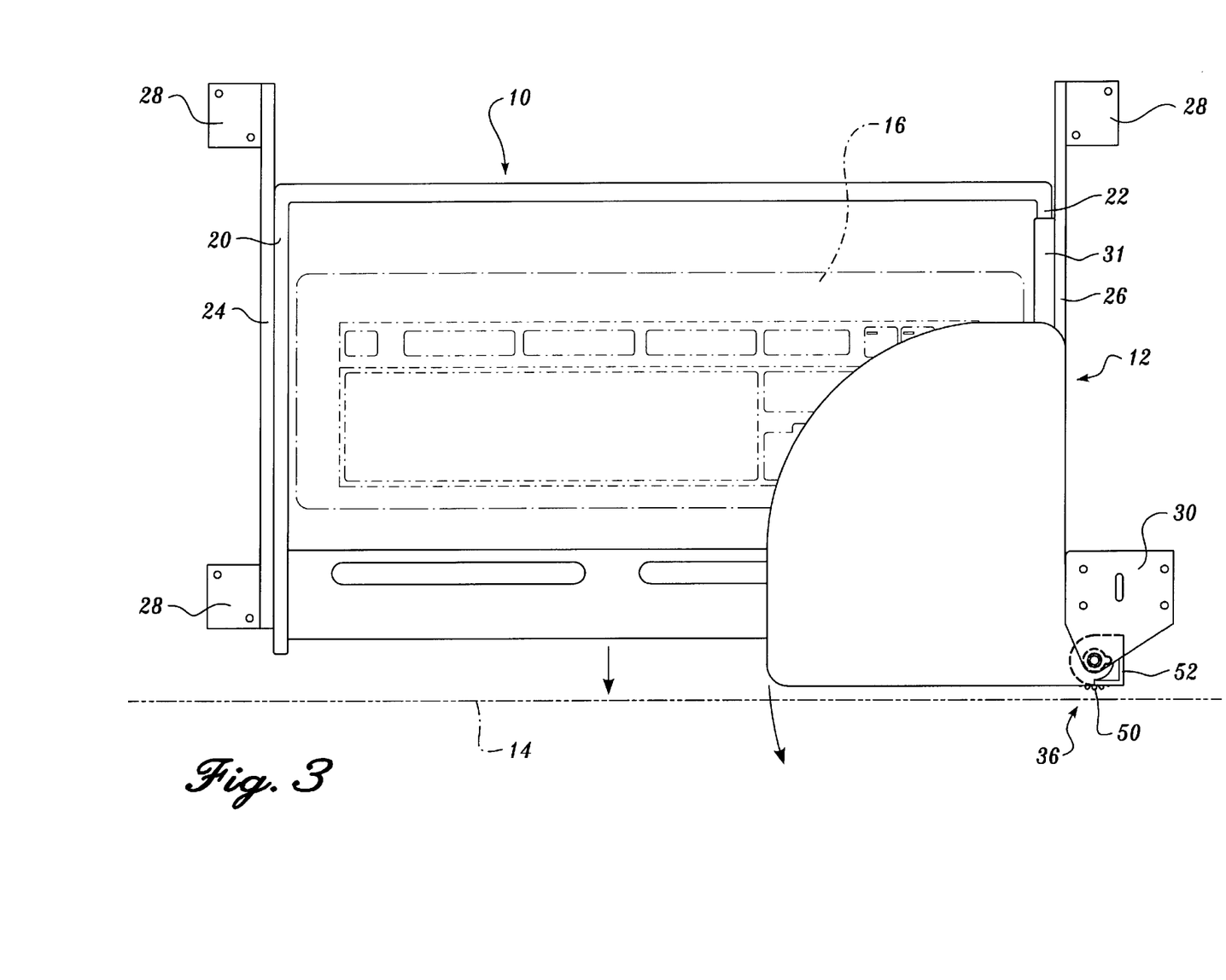
FIG. 3 is a plan view of the keyboard tray and the mouse tray in a retracted position beneath a table top.

Mouse tray 12, mounting bracket 30, interconnect member 36, and keyboard tray 10 are all interconnected as shown by the dotted lines in FIG. 2 to an assembly, as shown in FIG. 3, in a retracted position beneath table 14. In this position, rails 20 and 22 are retracted within slots of rail guides 24 and 26. Gear 50 is engaged with the first teeth of rack 32 beneath mouse tray 12. This position of gear 50 keeps mouse tray 12 in a retracted position beneath table 14 above keyboard tray 10. In this position, one of the linear edges of mouse tray 12 is parallel to the front edge of table 14 with the other linear edge running perpendicularly in a rearward direction above right rail 22 and right rail guide 26.

Figure 4:
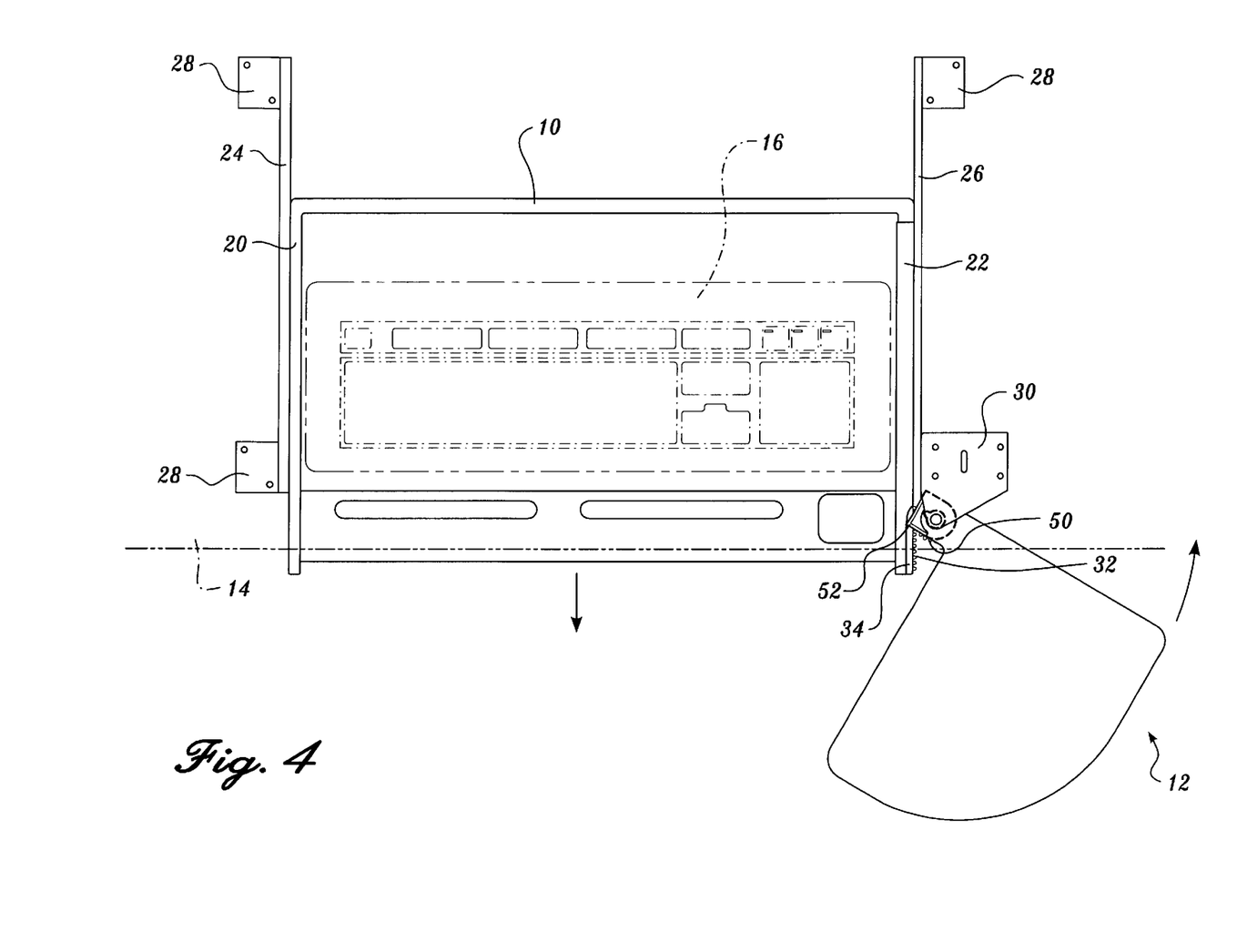
FIG. 4 is a plan view of the keyboard tray and the mouse tray as the keyboard tray begins to be extended from beneath the table.

As seen in FIG. 4, keyboard tray 10 is moved outwardly from under table 14 rack 32 engaged with gear 50 causing gear 50, and thus mouse tray 12, to pivot outwardly to an extended position. While pivoting, clearance for the corners of shoulder 52 formed by the flat side thereof is provided by shoulder recess 34. Since rack 32 is at the forward portion of rail 22, mouse tray 12 is extended to its usable position before keyboard tray 10 is completely extended from beneath table 14. Alternatively, rack 32 could be provided further back on right rail 22 or gear 50 may be of larger diameter with the greater number of teeth with a correspondingly longer rack 32.

Figure 5:
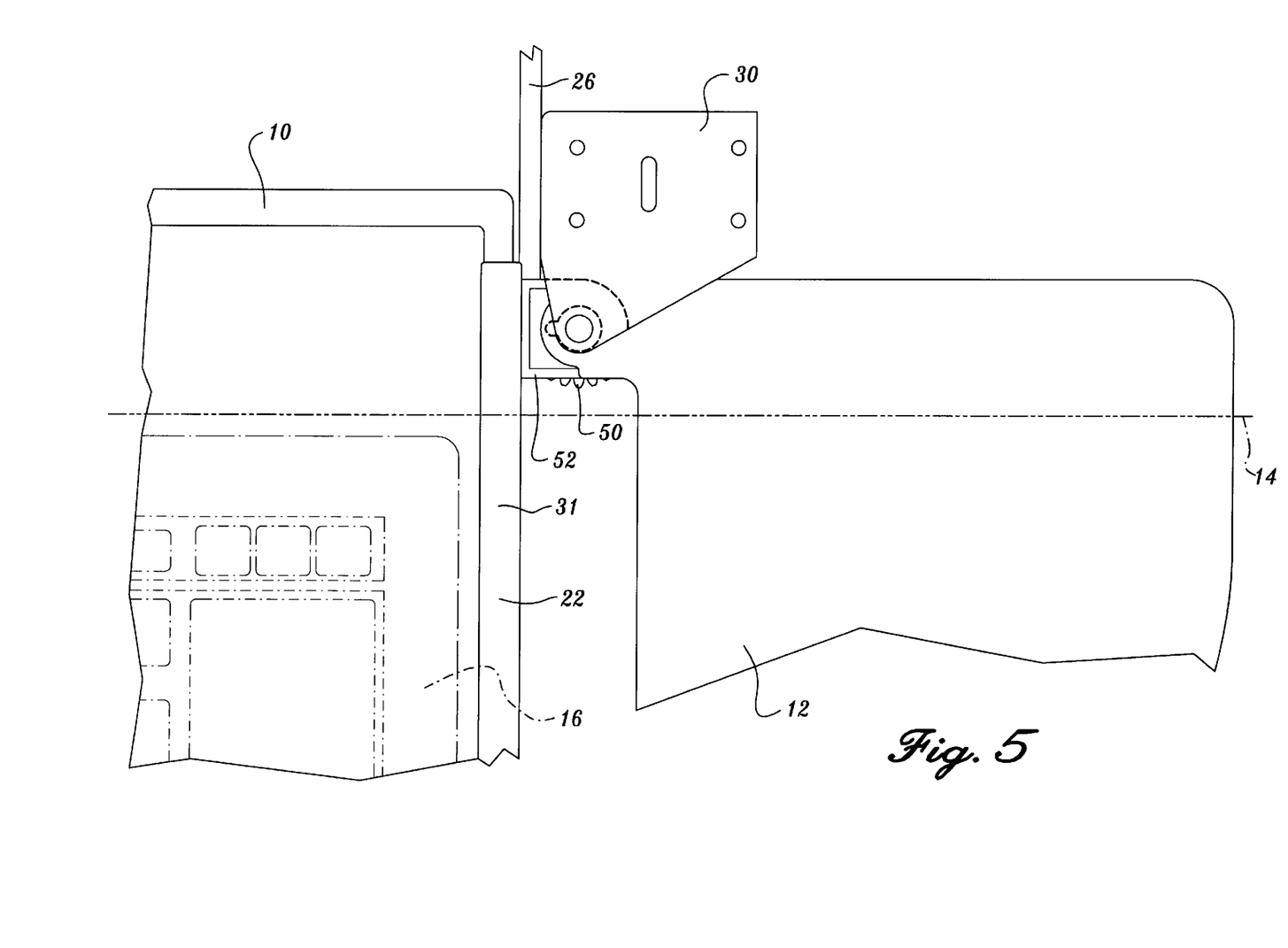
FIG. 5 is a plan view showing the interconnection between the keyboard tray and the mouse tray once the trays are in a fully extended position.

Finally, FIG. 5 illustrates a fully extended position of keyboard tray 10. In this position, mouse tray 12 is also fully extended with the flat side of shoulder 52 abutting cover 31. After gear 50 rotates past rack 32, shoulder 52 simply slides along the side of cover 31, ensuring that mouse tray 12 retains its extended orientation.

When keyboard tray 10 is retracted beneath table 14, shoulder 52 again slides along cover 31 until it reaches shoulder recess 34 and gear 50 engages rack 32. As further retraction occurs, the engagement of gear 50 with rack 32 causes mouse tray 12 to pivot 180° back to a retracted position above the right side of keyboard tray 10. Thus, the user of keyboard tray 10 and mouse tray 12 only has to grasp keyboard tray 10 to carry out the retraction and extension of both keyboard tray 10 and mouse tray 12. Such an arrangement is a further advantage of having a keyboard tray by providing a mouse tray which is also off the top of table 14. Thus, valuable space for papers, computer monitors or other items on top of table 14 is preserved.

Also, since keyboard 16, when used with a keyboard tray, is moved closer to the user of keyboard 16, it can be difficult for the user to reach mouse 36 if it were placed on table 14. However, with mouse tray 12 the reach required to access keyboard 16 is the same as that to access mouse 36. Thus, a more user friendly hand to controller interface is provided and the user does not have to constantly shift forward and backward when going from keyboard to mouse and back again.

While the preferred embodiment of the invention has been illustrated and described, it will be appreciated that various changes can be made therein without departing from the spirit and scope of the invention. For example, a trackball could be pivotally secured to bracket 30 to retract beneath table 14. In this case, the trackball may take the place of mouse tray 12. Therefore, when a tray is referred to, alternate structures are also included.

The embodiments of the invention in which an exclusive property or privilege is claimed are defined as follows:

1. An apparatus for attaching to a structure, said apparatus comprising:
    (a) a mounting bracket for attaching to a structure;
    (b) a retractable bracket slidably mounted to said bracket, said drawer defining a front edge behind which the drawer is capable of fully retracting;
    (c) a rail attached to said drawer; and
    (d) a tray including: (i) means for engaging said rail and (ii) an eccentrically positioned pivotal mount attached to said tray, said means for engaging including means for pivoting said tray about said eccentrically positioned pivotal mount when said drawer is moved forwardly or rearwardly relative to said bracket between a first position in which said drawer, said tray and said eccentrically positioned pivotal mount are substantially maintained behind said front edge of said drawer and a second position in which the eccentrically positioned pivotal mount remains behind said front edge of said drawer, at least a portion of said drawer is pulled forward of said front edge, and a substantial portion of the tray is swung outward to extend past said front edge of said structure.

2. The apparatus of claim 1, wherein said means for pivoting said tray comprises a gear attached to said tray and a rack attached to said rail and configured to engage said gear.

3. The apparatus of claim 1, wherein said drawer comprises a sliding surface and wherein said tray further comprises a shoulder, said shoulder including a flat portion configured to engage said sliding surface, said drawer, said rail, said means for engaging, and said shoulder being configured such that as said drawer slides forward and rearward relative to said bracket, the means for pivoting the tray pivots the tray during a first portion of the slide, and said flat portion engages said sliding surface during a second portion of the slide, the engagement of said flat surface with said sliding surface serving to prohibit rotation of said tray during said second portion of the slide of said drawer.

4. The apparatus of claim 1, wherein said drawer further comprises a recessed portion adjacent said sliding portion, said recess being configured to receive said shoulder during said first portion of said slide.

5. An apparatus for attaching to a structure, said apparatus comprising:

(a) a mounting bracket for attaching to a structure, said bracket defining a front edge;
    (b) a first rail slidably mounted to said bracket;
    (c) a rack attached along at least a portion of said rail; and
    (d) a tray including: (i) a gear engageable with said rack and (ii) an eccentrically positioned pivotal mount attached to said bracket, said tray, said rail, and said rack being configured such that the engagement of said gear with said rack combined with a sliding movement of said rail along said slidable mount causes said tray to pivot between a first position in which the tray is substantially maintained behind said front edge and a second position in which a substantial portion of the tray is extended beyond said front edge.

6. The apparatus of claim 5, wherein said mounting bracket is attached to said eccentrically positioned pivotal mount of said tray.

7. The apparatus of claim 6, further comprising a keyboard tray attached to said rail and including a second rail for attaching to a structure.

8. The apparatus of claim 6, wherein said rack extends along a forward portion of said first rail and sliding surface extends along a rearward portion of said rail, and wherein said tray further comprises a shoulder adjacent said gear, said shoulder including a flat portion configured to engage said sliding surface such that said tray does not pivot along the rearward position of said rail.

9. The apparatus of claim 8, wherein said rail further includes a recessed portion adjacent said rack for receiving said shoulder when said rail and said tray are mounted to a structure and when said gear is engaged with said rack.

10. An apparatus for attaching to a structure, the apparatus comprising:

(a) a mounting bracket for securing to the underside of a structure;
    (b) a keyboard drawer slidably attached to the mounting bracket, said drawer including a rail on one side; and
    (c) a pointer instrument tray including: (i) means for engaging said rail and (ii) an eccentrically positioned pivotal mount attached to said tray, said drawer, said mounting bracket, and said tray being configured so that sliding of said drawer along said mounting bracket causes said tray to pivot about said eccentrically positioned pivotal mount between a first position in which the tray is substantially maintained underneath a structure to which said mounting bracket is attached and a second position in which a substantial portion of the tray is removed from underneath a structure to which said mounting bracket is attached.

11. The apparatus of claim 10, wherein said means for engaging said rail comprises a gear attached to said tray for engaging said rail.

12. The apparatus of claim 11, wherein said rail further comprises a rack for engaging said gear.

13. The apparatus of claim 12, wherein said tray further comprises a shoulder including a flat portion adjacent said gear and wherein said rack extends along a forward portion of said rail and a sliding surface extends along a rearward portion of said rail, and wherein said flat portion is configured to engage said sliding surface such that said tray does not pivot along the rearward portion of said rail.

14. The apparatus of claim 10, wherein said tray further comprises a shoulder including a flat portion adjacent said gear and wherein said rack extends along a forward portion of said rail and a sliding surface extends along a rearward portion of said rail, and wherein said flat portion is configured to engage said sliding surface such that said tray does not pivot along the rearward portion of said rail.

15. An apparatus for attaching to a table or similar structure, said apparatus comprising:

(a) a mounting bracket for securing beneath a table;

(b) a rail guide secured to said mounting bracket;

(c) a keyboard drawer including a rail on one side slidably mounted to said rail guide, said rail further including a rack attached along at least a portion thereof, said rail having a forward portion and a rearward portion; and (d) a mouse tray pivotally coupled to said mounting bracket and including a gear engageable with said rack.

16. The apparatus of claim 15, wherein said rack extends along the forward portion of said rail and wherein said mouse tray further comprises a shoulder adjacent said gear, said shoulder including a flat portion configured to engage the rearward portion of said rail so as to maintain the orientation of said tray along the rearward portion of said rail.

17. The apparatus of claim 16, wherein said rail further includes a recessed portion adjacent said rack for receiving said shoulder when said shoulder rotates with respect to said rail and said gear is engaged with said rack.

* * * * *

UNITED STATES PATENT AND TRADEMARK OFFICE
CERTIFICATE OF CORRECTION

PATENT NO. : 5,771,814
DATED : June 30, 1998
INVENTOR(S) : E. Clausen

It is certified that error appears in the above-identified patent and that said Letters Patent is hereby corrected as shown below:

| COLUMN | LINE | | |
|---|---|---|---|
| [56] | Refs. Cited | insert following reference: --660,310  11/1951  England ..............312/271-- | |
| [57] Pg. 1, col. 2 | Abstract 11 of text | after "thereof" please insert --.-- | |
| 6 (Claim 8, | 27 line 7) | "position" should read --portion-- | |

Signed and Sealed this

Sixth Day of October, 1998

Attest:

BRUCE LEHMAN

Attesting Officer

Commissioner of Patents and Trademarks